Figure 1:
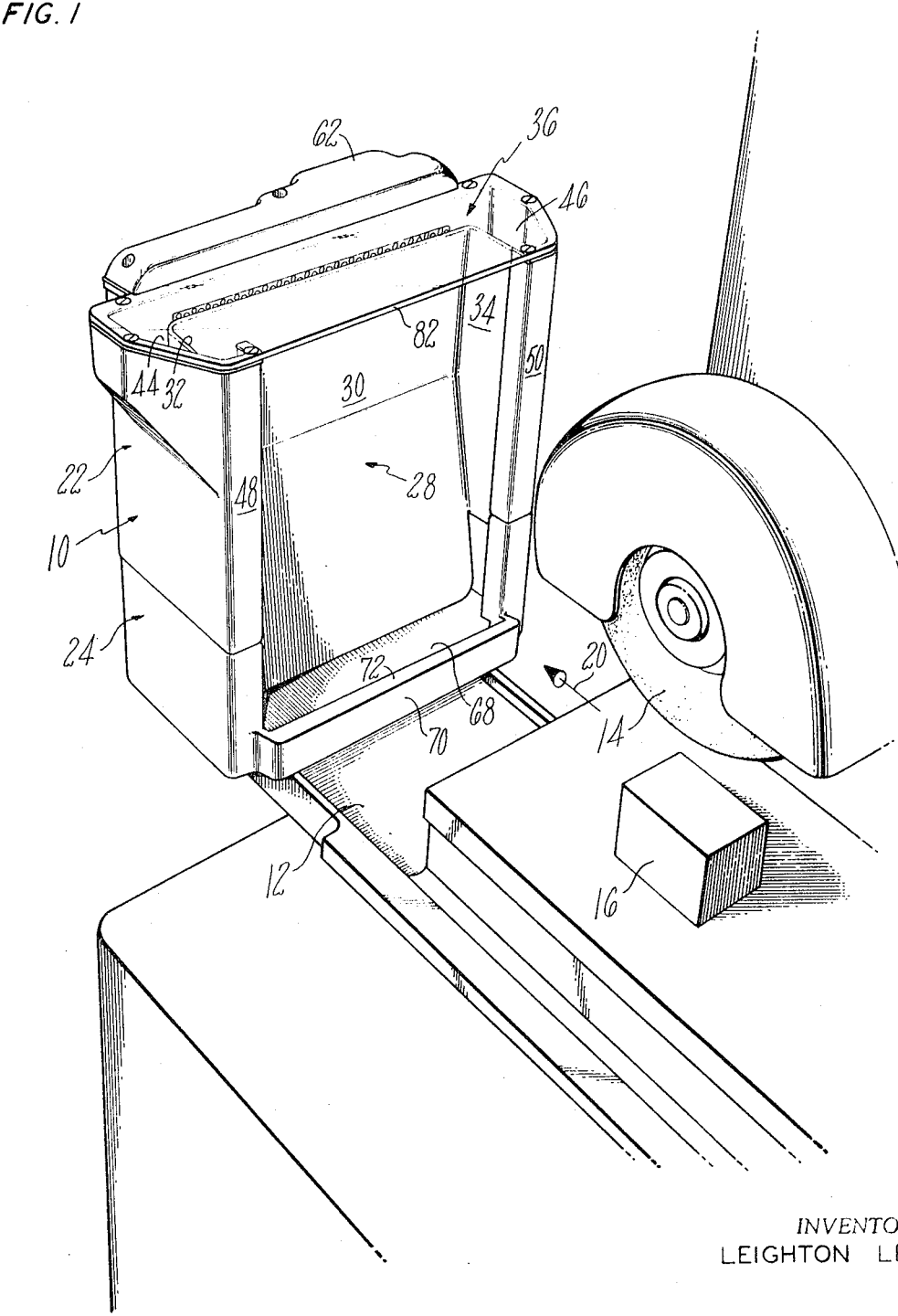

United States Patent
Lee, II

[15] 3,651,607
[45] Mar. 28, 1972

[54] WASTE COLLECTOR
[72] Inventor: Leighton Lee, II, Guilford, Conn.
[73] Assignee: The Lee Company, Westbrook, Conn.
[22] Filed: Oct. 29, 1969
[21] Appl. No.: 872,141

[52] U.S. Cl..............................51/270, 210/167, 210/196, 210/247, 210/248, 210/255
[51] Int. Cl..........................................................B24b 55/06
[58] Field of Search.................210/167, 255, 247, 248, 194, 210/196; 51/270

[56] References Cited

UNITED STATES PATENTS

| | | | |
|---|---|---|---|
| 2,723,513 | 11/1955 | Slonneger | 51/270 X |
| 2,788,954 | 4/1957 | Paasche | 210/167 X |
| 3,341,016 | 9/1967 | Paasche | 210/167 X |
| 3,460,294 | 8/1969 | Stumpf | 51/270 |
| 3,525,183 | 8/1970 | Gargrave | 51/270 |

Primary Examiner—Samih N. Zaharna
Assistant Examiner—Frederick F. Calvetti
Attorney—Prutzman, Hayes, Kalb & Chilton

[57] ABSTRACT

Self-contained waste collector usable in a manufacturing operation and having a spillway of U-shaped configuration in confronting downstream relation to a path of moving debris and directing a gravity waterfall of collection liquid to effect a continuously wetted exposed surface of increased collection area coextensive with the spillway for entrapping debris for disposal.

2 Claims, 2 Drawing Figures

Patented March 28, 1972

3,651,607

2 Sheets-Sheet 1

INVENTOR.
LEIGHTON LEE II

BY Pritzman, Hayes, Kalb and Chilton
ATTORNEYS

Patented March 28, 1972

3,651,607

2 Sheets-Sheet 2

WASTE COLLECTOR

This invention generally relates to waste collectors and particularly concerns collectors of a waterfall-type utilizing a collection liquid for entrapping debris from a manufacturing operation.

A principal object of this invention is to provide an improved waste collector which is a completely self-contained unit having a significantly increased collection surface area.

Another object of this invention is to provide a waste collector of the type described particularly suited to be mounted on either fixed or moving parts of a machine.

Other objects will be in part obvious and in part pointed out more in detail hereinafter.

A better understanding of the invention will be obtained from the following detailed description and the accompanying drawings of an illustrative application of the invention.

Figure 2:
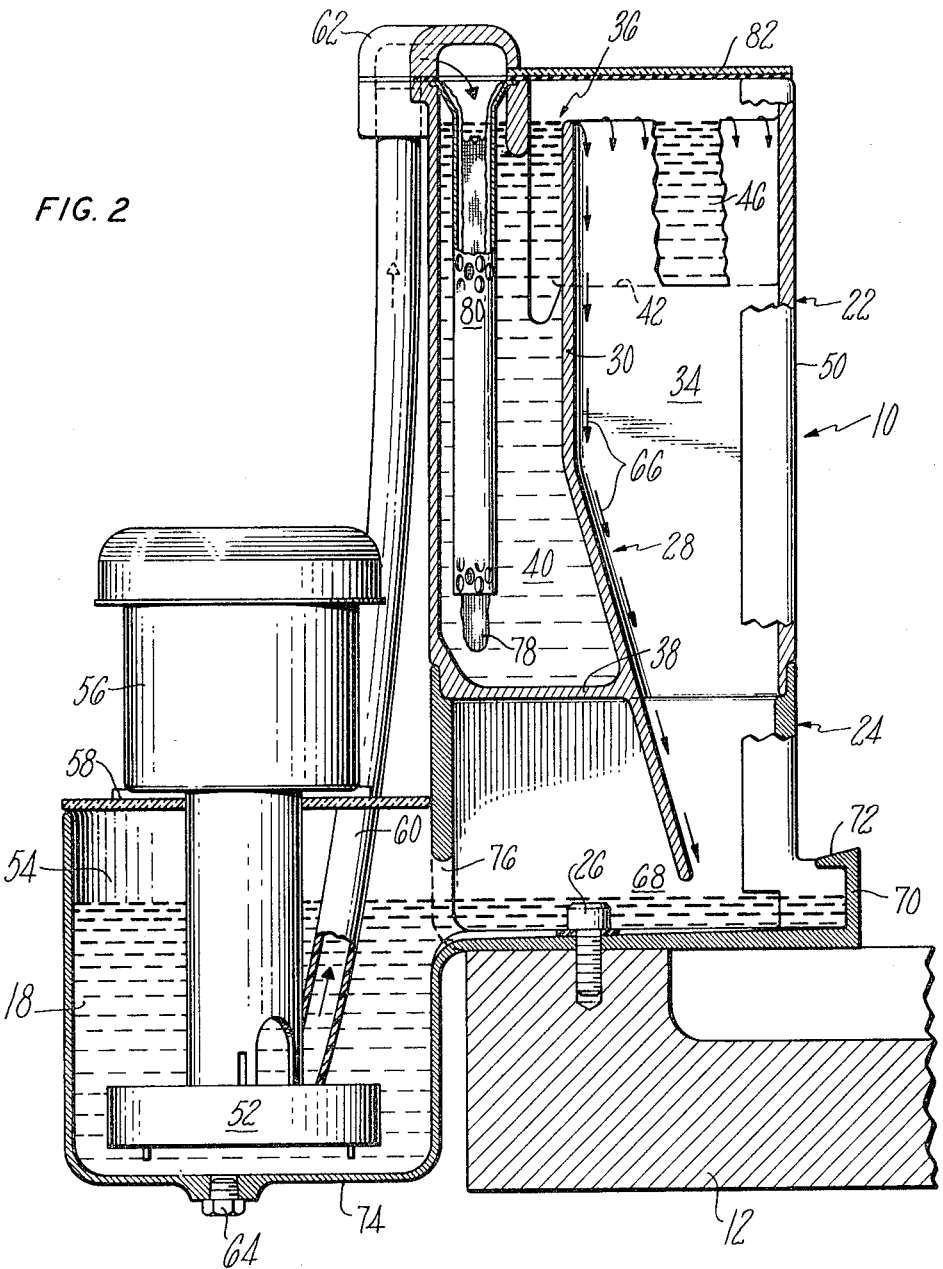

In the drawings:

FIG. 1 is an isometric view showing a waste collector embodying this invention mounted on a grinding machine; and FIG. 2 is an enlarged side view, partly in section and partly broken away, of the waste collector of FIG. 1.

Referring in detail to the drawings, a waste collector 10 is shown mounted on a reciprocable table 12 of a grinding machine shown having a grinding wheel 14 operatively mounted for grinding workpieces such as that shown at 16. It will be understood that the grinding machine is shown only for illustrative purposes and that the collector 10 is equally useful in a variety of other applications wherein dust particles, grit, shavings and similar effluence emanating from a manufacturing operation, e.g., are desired to be collected.

In accordance with this invention, the collector 10 is mounted upon the table 12, downstream of the source of dust and grit, to entrap and remove the same for disposal by means of a gravity assisted waterfall-type flow of suitable collection liquid 18 providing a continuously wetted exposed surface in confronting relation in the path of the moving debris such as that represented by the arrow 20.

In the specific illustrated embodiment, the body of the collector 10 comprises an upper container 22 supported on a base 24 fixed to the table 12 by a suitable fastener such as at 26. The upper container 22 is preferably separable from the base 24 to promote easy manufacture and installation as well as for convenience in packing a collector for shipment and flushing and cleaning an installed unit.

To provide a collection surface of significantly increased collection area which will also act to confine and entrap the moving debris, a generally U-shaped spillway 28 is defined in the container 22 by a center plate 30 having side walls 32 and 34 connected at opposite sides of the plate 30.

A collection fluid reservoir 36 is formed behind the spillway 28 by means of a wraparound housing integrally joined to the front edges of the side walls 32, 34 and extending around and above the back of the U-shaped spillway 28 in spaced apart relation thereto. A bottom wall 38 of the housing is connected to the back of the center plate 30 to define a main reservoir chamber 40, and the wraparound housing extends in opposite lateral directions above its juncture (such as at 42) with the side walls 32, 34 to form a pair of troughs 44, 46 on opposite lateral sides of the container 22 in communication with the main reservoir chamber 40. In addition, front panels 48, 50 of the housing each extend inwardly toward one another and rearwardly toward the center plate 30, thereby overlapping marginal portions of the side walls 32, 34 of the spillway 28 to serve as splashguards. It will be noted that the front of the base 24 is similarly formed in continuation with the front panels 48, 50 of the container housing to provide a shielded spillway extending to the bottom of the base 24.

The reservoir 36 is continuously filled with the collection liquid 18 to overflow the spillway 28. For this purpose, a pump 52 is provided in a drainage chamber 54 at the rear of the base 24. The pump 52 is of a conventional type illustrated as being driven by an electrical motor 56 mounted on a motor support 58 enclosing the top of the drainage chamber 54. The drainage chamber 54 in turn is connected to the reservoir 36 by tubing 60 fitted into an upper rear portion of the container 22 underlying a removable cover 62.

In addition, the bottom of the drainage chamber 54 is also provided with a drain plug 64 to further promote quick and easy flushing and cleaning of an installed unit.

By virtue of the above-described structure, debris moving in a path downstream from the grinding wheel 14 will impinge on the continuously wetted surface (represented by arrows 66) flowing over the U-shaped spillway 28 and will be entrained in the flowing liquid to be carried into a compartment 68 underlying the spillway 28.

To minimize any possibility of the collection liquid 18 splashing out of the compartment 68, a front splashguard panel 70 of inverted L-shaped cross section is formed to extend across the front of the compartment 68 and provides a rearwardly extending lip 72 overlying the front of the compartment 68.

To permit the collector 10 to be mounted on either a fixed or moving part of a machine, e.g., such as the reciprocable table 12 of the illustrated grinder, the bottom 74 of the drainage chamber 54 is disposed well below that of the relatively shallow compartment 68, and the drainage chamber 54 is dimensioned to provide a considerably greater volume than that of the compartment 68 below the spillway 28. Thus, a relatively large mass of collection liquid 18 is normally contained within the drainage chamber 54 behind an opening 76 of limited size which serves to communicate the drainage chamber 54 with the compartment 68. By virtue of the above-described structure, the collector may be mounted on normally movable as well as fixed parts of machines. Only a minimal amount of splashing will be encountered, for backflow of collection liquid from the drainage chamber 54 is limited by the restricted opening 76 and the shielded spillway 28 minimizes the loss of any collection liquid 18 from the spillway 28.

The collection liquid carrying the entrapped debris is pumped from the drainage chamber 54 through the tubing 60 and into the reservoir 36 to flow into a filter bag 78 which is preferably of cloth or similar disposable material. The filter bag 78 is shown fitted within a filter holder 80 formed of a suitable perforated material and is shown clamped between the removable cover 62 and the top of the container 22 to permit quick and easy removal and replacement of the filter bag 78. Inadvertent discharge of the collection liquid from the top of the collector is minimized by the provision of a splash shield 82 preferably secured at the top of the container 22.

As the collection liquid 18 passes through the perforated filter holder 80 into the reservoir 36, the debris collected in the spillway 28 is deposited in the bag 78, and the filtered liquid is recirculated to again flow over the spillway 28 in a continuous collecting and filtering operation.

By virtue of the above-described construction, the waste collector of this invention will be seen to be a self-contained recirculating unit establishing a gravity assisted waterfall providing a continuously wetted exposed surface of significantly increased area substantially coextensive with that of the U-shaped spillway for efficient, trouble-free collection of debris in a variety of different applications.

As will be apparent to persons skilled in the art, various modifications, adaptations and variations of the foregoing specific disclosure can be made without departing from the teachings of the present invention.

I claim:

1. In a grinding machine, a frame including a table, a grinding wheel operatively mounted on the frame, a self-contained waterfall-type waste collector comprising a housing fixed to the table in downstream relation to the grinding wheel for collecting debris moving along a path downstream from the grinding wheel, a plate secured to the housing, the plate being of generally U-shaped configuration defining a spillway for providing a continuously wetted surface for entrapping debris moving along a path downstream from the grinding wheel, the housing providing a reservoir behind the spillway including a pair of spaced opposed troughs behind opposite sides of the U-shaped plate and a central trough behind a central portion of the U-shaped plate and interconnecting the spaced opposed troughs to jointly define a reservoir of generally uniform height and of U-shaped configuration generally corresponding to that of the spillway, the bottom of the spaced opposed troughs being in vertically raised relation to that of the central trough of the reservoir with the central trough of the reservoir having a depth greater than that of the spaced opposed troughs, a recirculating fluid system providing a continuous gravity flow of collection liquid over the spillway, a compartment underlying the spillway, a drainage chamber in communication with the compartment, a fluid connection between the drainage chamber and the central trough of the reservoir, a pump for pumping collection liquid through the fluid connection into the reservoir to flow over the spillway, and a filter disposed in the central trough of the reservoir behind the central portion of the spillway for separating debris from the collection liquid, to permit facile installation and removal of the filter in a waste collector of compact size.

2. The combination of claim 1 wherein the drainage chamber is of enlarged size in relation to the compartment and disposed at least in part below the compartment, means providing a restriction between the compartment and drainage chamber minimizing back flow of collection liquid from the drainage chamber into the compartment, whereby the waste collector is suitable to be operatively fixed to a reciprocating grinding table.

* * * * *